United States Patent
Kumar et al.

(10) Patent No.: US 12,530,522 B2
(45) Date of Patent: Jan. 20, 2026

(54) METHOD AND SYSTEM FOR GENERATING AN AUTOMATION ENGINEERING PROJECT IN A TECHNICAL INSTALLATION USING MULTIDISCIPLINARY APPROACH

(71) Applicant: Siemens Aktiengesellschaft, Munich (DE)

(72) Inventors: Vasu Kumar, Uttar Pradesh (IN); Kannan R, Karnataka (IN); Sezhiyan Thiagarajan, Karnataka (IN); Prashanth Uppunda, Karnataka (IN); Martin Witte, Schwabach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 17 days.

(21) Appl. No.: 18/150,227

(22) Filed: Jan. 5, 2023

(65) Prior Publication Data

US 2023/0237249 A1 Jul. 27, 2023

(30) Foreign Application Priority Data

Jan. 11, 2022 (EP) .................................. 22150953

(51) Int. Cl.
*G06F 40/143* (2020.01)
*G06F 40/137* (2020.01)
*G06N 5/02* (2023.01)

(52) U.S. Cl.
CPC .......... *G06F 40/143* (2020.01); *G06F 40/137* (2020.01); *G06N 5/02* (2013.01)

(58) Field of Classification Search
CPC ........ G06F 40/143; G06F 40/137; G06N 5/02

(Continued)

(56) References Cited

U.S. PATENT DOCUMENTS 7,272,815 B1\* 9/2007 Eldridge .................. G06F 8/71
717/109
9,310,790 B2\* 4/2016 Krishnaswamy ...... G05B 17/02
(Continued)

FOREIGN PATENT DOCUMENTS

EP 3848866 A1 7/2021

OTHER PUBLICATIONS

Bihani, P. et al. (Sep. 2017). Concept for AutomationML-based interoperability between multiple independent engineering tools without semantic harmonization: Experiences with AutomationML, pp. 1-8. (Year: 2018).\*

(Continued)

*Primary Examiner* — Jeremy L Stanley
(74) *Attorney, Agent, or Firm* — Schmeiser, Olsen & Watts LLP

(57) ABSTRACT

A method and system for generating an automation engineering project in a technical installation is provided. The method includes receiving, by a processing unit, a request to generate an automation engineering project for a technical installation. The method further includes generating a first name graph based on the information about the hardware configuration associated with the automation engineering project. The method further includes generating, by the processing unit, a second name graph based on the analysis of the one or more modifications of the hardware configuration of the technical installation. The method further includes generating, by the processing unit, the automation engineering project from the plurality of engineering objects based on a comparison of the first name graph and the second name graph.

12 Claims, 8 Drawing Sheets

(58) Field of Classification Search
USPC .......................................................... 715/234
See application file for complete search history.

(56) References Cited

U.S. PATENT DOCUMENTS

| | | | | |
|---|---|---|---|---|
| 10,339,470 | B1* | 7/2019 | Dutta | G06N 20/20 |
| 11,188,498 | B2* | 11/2021 | Uppunda | G06Q 10/06 |
| 2003/0061274 | A1* | 3/2003 | Lo | G05B 19/056 |
| | | | | 709/203 |
| 2003/0061311 | A1* | 3/2003 | Lo | G06Q 30/04 |
| | | | | 717/176 |
| 2004/0015823 | A1* | 1/2004 | Nolan | G06F 8/20 |
| | | | | 717/104 |
| 2009/0222495 | A1* | 9/2009 | Kleyer | G06F 8/71 |
| | | | | 707/999.203 |
| 2014/0200688 | A1* | 7/2014 | Wilke | G05B 19/0426 |
| | | | | 700/83 |
| 2015/0346713 | A1* | 12/2015 | Gerber | G05B 19/418 |
| | | | | 700/96 |
| 2016/0154910 | A1* | 6/2016 | Altare | G06Q 10/06 |
| | | | | 703/13 |
| 2018/0089337 | A1* | 3/2018 | Uppunda | G06F 8/71 |
| 2018/0136910 | A1* | 5/2018 | Noetzelmann | G05B 19/0426 |
| 2019/0095449 | A1* | 3/2019 | Uppunda | G06F 16/116 |
| 2019/0362239 | A1* | 11/2019 | Runkler | G05B 19/41865 |
| 2020/0257259 | A1* | 8/2020 | Heckel | G05B 17/02 |
| 2020/0379891 | A1* | 12/2020 | Canter | G06F 8/71 |
| 2021/0356947 | A1* | 11/2021 | Shomura | G05B 19/41865 |
| 2022/0147581 | A1* | 5/2022 | Zeng | G06N 5/02 |
| 2022/0155765 | A1* | 5/2022 | Barth | G05B 19/41865 |
| 2022/0345354 | A1* | 10/2022 | Anicic | G06F 40/20 |

OTHER PUBLICATIONS

Wally, Bernhard, Christian Huemer, Alexandra Mazak, and Manuel Wimmer. "IEC 62264-2 for AutomationML." In Proc. 5th Autom. ML User Conf, pp. 1-7. (Year: 2018).*

AutomationML.org,"AutomationML-Brochure," Jun. 2021, 32 pages. (Year: 2021).*

Ye et al., "An AutomationML/OPC UA-based Industry 4.0 Solution for a Manufacturing System," 2018 IEEE 23rd International Conference on Emerging Technologies and Factory Automation (ETFA), pp. 544-550. (Year: 2018).*

Wally et al.,"AutomationML, ISA-95 and Others: Rendezvous in the OPC UA Universe," 2018 IEEE 14th International Conference on Automation Science and Engineering (CASE) Munich, Germany, Aug. 20-24, 2018, pp. 1381-1387. (Year: 2018).*

Graeser, O. et al. (2011). AutomationML as a basis for offline—and realtime-simulation—: Planning, simulation and diagnosis of automation systems. ICINCO 2011—Proc. of the 8th Intl. Conf. on Informatics in Control, Automation & Robotics, pp. 359-368. (Year: 2011).*

Bader, Sebastian & Grangel-González, Irlan & Nanjappa, Priyanka & Vidal, Maria-Esther & Maleshkova, Maria. (2020). A Knowledge Graph for Industry 4.0. 10.1007/978-3-030-49461-2_27. (Year: 2020).*

Nagy, László & Ruppert, Tamas & Abonyi, János. (2022). Human-centered knowledge graph-based design concept for collaborative manufacturing. 1-8. 10.1109/ETFA52439.2022.9921484. (Year: 2022).*

Banerjee et al., 2017. Generating Digital Twin Models using Knowledge Graphs for Industrial Production Lines. In Proceedings of the 2017 ACM on Web Science Conference (WebSci '17). Association for Computing Machinery, New York, NY, USA, 425-430. (Year: 2017).*

Jilg, David & Stuckart, Nico. (2021). Conception and Implementation of a Digital Twin using an Enterprise Knowledge Graph Platform. 10.13140/RG.2.2.17553.92004. (Year: 2021).*

Petr Novák, Fajar J. Ekaputra, Stefan Biffl, Generation of Simulation Models in MATLAB-Simulink Based on AutomationML Plant Description, IFAC-PapersOnLine, vol. 50, Issue 1, 2017, pp. 7613-7620. (Year: 2017).*

Biffl, Stefan, et al. "Linking and versioning support for AutomationML: A model-driven engineering perspective." 2015 IEEE 13th International Conference on Industrial Informatics (INDIN). IEEE, 2015. (Year: 2015).*

R. Mordinyi and S. Biffl, "Versioning in Cyber-physical Production System Engineering—Best-Practice and Research Agenda," 2015 IEEE/ACM 1st International Workshop on Software Engineering for Smart Cyber-Physical Systems, Florence, Italy, 2015, pp. 44-47. (Year: 2015).*

K. Stark, T. Goldschmidt, J. Doppelhamer, P. Bihani and D. Goltz, "Cloud-based integration of robot engineering data using AutomationML," 2018 IEEE 14th International Conference on Automation Science and Engineering (CASE), Munich, Germany, 2018, pp. 645-648 (Year: 2018).*

Björkelund, Anders, Jacek Malec, Klas Nilsson, and Pierre Nugues. "Knowledge and skill representations for robotized production." IFAC Proceedings vols. 44, No. 1 (2011): 8999-9004. (Year: 2011).*

Ontotext.com,"What is a Knowledge Graph?," archived Nov. 13, 2020, archive.org, 8 pages. (Year: 2020).*

Drath, Rainer. "Let's talk AutomationML what is the effort of AutomationML programming?." In Proceedings of 2012 IEEE 17th International Conference on Emerging Technologies & Factory Automation (ETFA 2012), pp. 1-8. IEEE, 2012. (Year: 2012).*

Mordinyi, R., & Biffl, S. (May 2015). Versioning in Cyber-physical Production System Engineering—Best-Practice and Research Agenda. In 2015 IEEE/ACM 1st International Workshop on Software Engineering for Smart Cyber-Physical Systems (pp. 44-47). IEEE. (Year: 2015).*

Steven Braun, Christian Bartelt, Martin Obermeier, Andreas Rausch, Birgit Vogel-Heuser, Requirements on Evolution Management of Product Lines in Automation Engineering, IFAC Proceedings Volumes, vol. 45, Issue 2, 2012, pp. 340-345. (Year: 2012).*

Tze Ying Sim, Fang Li and B. Vogel-Heuser, "Modules, version and variability management in automation engineering of machine and plant manufacturing," 2008 IEEE International Conference on Emerging Technologies and Factory Automation, Hamburg, Germany, 2008, pp. 46-49. (Year: 2008).*

N. Schmidt, A. Lüder, H. Steininger and S. Biffl, "AutomationML for user requirements fulfilment related to engineering process efficiency," IECON 2014—40th Annual Conference of the IEEE Industrial Electronics Society, Dallas, TX, USA, 2014, pp. 4902-4908. (Year: 2014).*

Bürdek, J., Kehrer, T., Lochau, M. et al. Reasoning about product-line evolution using complex feature model differences. Autom Softw Eng 23, 687-733 (2016). (Year: 2016).*

Feldman, S. et al.,"Modularity, Variant and Version Management in Plant Automation—Future Challenges & State of the Art," DS 70: Proceedings of Design 2012, the 12th International Design Conference, Dubrovnik, Croatia, Year: 2012, pp. 1689-1698. (Year: 2012).*

F. Waltersdorfer, T. Moser, A. Zoitl and S. Biffl, "Version management and conflict detection across heterogeneous engineering data models," 2010 8th IEEE International Conference on Industrial Informatics, Osaka, Japan, 2010, pp. 928-935. (Year: 2010).*

Elisabet Estvez et al: "Automatic generation of PLC automation projects from component-based models", The International Journal of Advanced Manufacturing Technology, Springer, Berlin, DE, vol. 35, No. 5-6, Jul. 18, 2007 (Jul. 18, 2007), pp. 527-540, XP019559231, ISSN: 1433-3015, DOI: 10.1007/S00170-007-1127-4.

* cited by examiner

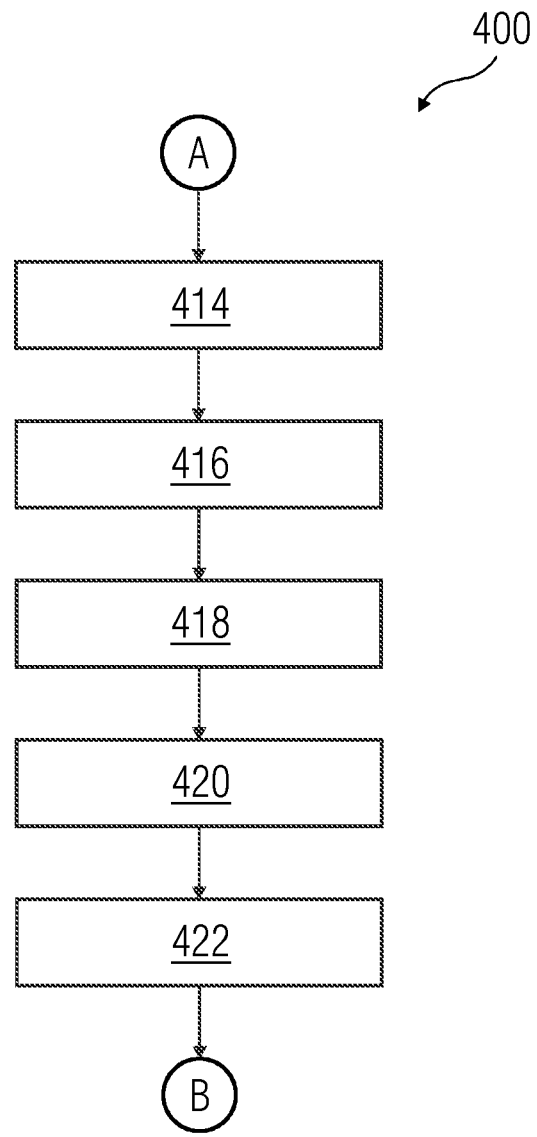

METHOD AND SYSTEM FOR GENERATING AN AUTOMATION ENGINEERING PROJECT IN A TECHNICAL INSTALLATION USING MULTIDISCIPLINARY APPROACH

CROSS-REFERENCE TO RELATED APPLICATIONS

This application claims priority to EP Application No. 22150953.2, having a filing date of Jan. 11, 2022, the entire contents of which are hereby incorporated by reference.

FIELD OF TECHNOLOGY

The following relates to a field of computer assisted programming, and more particularly relates to a method and system for generating an automation engineering project in a technical installation using multidisciplinary approach.

BACKGROUND

Typically, a technical installation comprises a plurality of hardware equipment. Examples of the plurality of hardware equipment comprises motors, robots, logical controllers, human machine interfaces, conveyor belts, and machine lathes. Deployment of the plurality of hardware equipment, into the technical installation, requires expertise of professionals from a plurality of engineering disciplines. For example, in order to configure a hardware configuration associated with a hardware equipment, an expertise of a hardware engineer is required. Similarly, to code a plurality of engineering objects (such as a program file, an openness file, an automation markup language (AML) file, a memory object) configured to automate the plurality of hardware equipment, an expertise of an automation engineer is required. Thus, the hardware engineer and the automation engineer are required to work in cooperation with each other, in order to deploy and automate the plurality of hardware equipment in the technical installation. Thus, it is vital to have a healthy exchange of technical information (about the technical installation) between the hardware engineer and the automation engineer. However, the automation engineer may find it difficult to understand technical information provided by the hardware engineer, especially when the technical information is provided in a data format which is unfamiliar to the automation engineer.

Thus, the technical information about the plurality of hardware equipment is exchanged between the hardware and automation engineer, by use of a commonly agreed upon format such as an automation markup language (AML). In one example, the commonly agreed upon format is an information exchange format defined between an electrical engineering application and an automation engineering application. In such a case, the hardware engineer may have to manually code the technical information associated with the plurality of hardware equipment, into an exchange data file. The exchange data file is then imported and used by the automation engineer to generate the plurality of engineering objects.

Typically, the technical installation may have thousands of hardware equipment, each with a specific hardware configuration. Since the hardware configuration of each of the thousands of hardware equipment may have to be coded into the exchange data file. Thus, the hardware engineer may have to manually code thousands of lines of code to exchange the technical information with the automation engineer.

In one use case, the hardware configuration of the technical installation is modified by the hardware engineer after import of the exchange data file by the automation engineer. In such a case, the hardware engineer has to manually inform the automation engineer about the modifications. The hardware engineer may have to manually modify the exchange data file based on the modifications informed by the hardware engineer. The exchange data file comprises a large number of data items. Therefore, it is laboursome for the hardware engineer to modify the exchange data file such that the integrity of the exchange data file is maintained. The automation engineer may then have to either manually re-import the modified exchange data file or manually adapt the modifications in the plurality of engineering objects. The automation engineer may find it extremely difficult to modify the plurality of engineering objects while maintaining the integrity of the automation engineering project.

Furthermore, the exchange data file fails to provide IT (information technology) tools which would enable an IT engineer to integrate OT (Operation technology) data with IT use cases.

Thus, it is laborious to ensure exchange of technical information between professionals of diverse engineering disciplines, and thereby ensure a smooth generation of the automation engineering project.

In light of above, there exists a need for an efficient method and system for generating an automation engineering project in a technical installation using a multidisciplinary approach.

SUMMARY

An aspect relates to a method and system for generating an automation engineering project in a technical installation using a multidisciplinary approach.

The aspect of embodiments of the invention are achieved by a method for generating an automation engineering project in a technical installation using a multidisciplinary approach. The method comprises receiving, by a processing unit, a request to generate a first automation engineering project for a technical installation. The request comprises information about hardware configuration associated with a plurality of hardware equipment of the technical installation. Examples of the plurality of hardware equipment comprises motors, robots, logical controllers, human machine interfaces, conveyor belts, and machine lathes. The information about the hardware configuration is coded as a first automation markup language script or the like. In one example, the hardware configuration is converted into the first automation markup language script by the processing unit. The hardware configuration comprises a power rating, a voltage rating, a durability, a strength, a electrical component configurations, symbol definitions, voltage and wiring aspects, associated with the plurality of hardware equipment in the technical installation.

In an embodiment, the first automation markup language script is encoded in an exchange data file used to exchange technical information between a hardware engineer and an automation engineer. The hardware configuration is encoded in the first automation markup language script in a hierarchical structure. The first automation markup language script comprises information about interrelationships between the plurality of hardware equipment and a plurality of engineering objects of a second automation engineering project. The plurality of engineering objects comprises software objects such as a program file, an openness file, an programming block, or a memory object. The second automation engineering project is an existing engineering project configured to control and automate the plurality of hardware equipment in the technical installation. In one example, the second automation engineering project configured to automate the plurality of engineering objects.

In an embodiment, the method further comprises analyzing, by the processing unit, the first automation markup language script to detect a plurality of nodes in the first automation markup language script. The method further comprises converting, by the processing unit, each of the plurality of nodes to one or more knowledge graph triples. Thus, the hierarchical relationships within the first automation markup language script is converted into a semantic representation of the one or more knowledge graph triples. The method further comprises generating, by the processing unit, a first name graph from the one or more knowledge graph triples. The first name graph comprises a knowledge graph based semantic representation of hierarchical relationships between each of the plurality of nodes in the first automation markup language script.

The first name graph comprises information about relationships between the hardware configuration of the plurality of hardware equipment and a plurality of engineering objects associated with the automation engineering project. The method further comprises receiving from a user, by the processing unit, information about one or more modifications in the hardware configuration of plurality of hardware equipment. In one example, the user may use an electrical designer application to modify the hardware configuration of the plurality of hardware equipment. In another example, the user may rearrange the plurality of hardware equipments, and rewire interconnections between the plurality of hardware equipments to modify the hardware configuration of the plurality of hardware equipments. In such a case, a modification in an arrangement of the plurality of hardware equipments is encoded as a second automation markup language script. The second automation markup language script comprises information about hierarchical relationships between the plurality of hardware equipment, after the modification of the hardware configuration of the plurality of hardware equipment.

In an embodiment, the method further comprises analyzing, by the processing unit, the first name graph, and the one or more modifications in the hardware configuration of the plurality of hardware equipment. The method further comprises generating, by the processing unit, a second name graph based on the analysis of the one or more modifications of the hardware configuration of the technical installation. The second name graph comprises information about relationships between a modified hardware configuration of the technical installation and the plurality of engineering objects.

The method further comprises determining, by the processing unit, a first hierarchical path between at least two nodes of the first name graph, and a second hierarchical path between corresponding nodes of the second name graph. The method further comprises comparing, by the processing unit, the determined first hierarchical path and the second hierarchical path.

In an embodiment, the method further comprises determining, by the processing unit, the plurality of differences between the first name graph and the second name graph, based on the comparison. In one example, the plurality of differences are determined by the processing unit by use of a knowledge graph query process. The method further comprises mapping, by the processing unit, the determined plurality of differences to one or more engineering objects of the plurality of engineering objects. The method further comprises modifying, by the processing unit, the one or more engineering objects of the plurality of engineering objects based on the second name graph. The method further comprises generating, by the processing unit, the automation engineering project from the plurality of engineering objects which comprises the one or more modified engineering objects.

In an embodiment, the method further comprises analyzing, by the processing unit, the second name graph to generate one or more user suggestions for modification of the automation engineering project. The method further comprises displaying, by the processing unit, the one or more user suggestions to one or more users.

In an embodiment, the method comprises generating, by the processing unit, a simulation instance for an industrial environment. The method further comprises simulating, by the processing unit, deployment of the generated first automation engineering project in the industrial environment by executing one or more functionalities of the first automation engineering project on the generated simulation instance.

In an embodiment, the method further comprises determining, by the processing unit, whether the generated first automation engineering project is valid, based on a result of the simulated execution of the generated first automation engineering project. The method further comprises deploying, by the processing unit, the first automation engineering project in real-time onto the industrial environment, based on a determination that the generated first automation engineering project is valid. The method further comprises displaying, by the processing unit, the automation engineering project on one of a display device.

Embodiments of the invention are also achieved by an engineering system for generating an automation engineering project in the technical installation. The engineering system comprises one or more processing unit(s) and a memory coupled to the processing unit. The memory comprises an automation module stored in the form of machine-readable instructions executable by the processing unit. The automation module is configured for performing the method as described above.

Embodiments of the invention are also achieved by an industrial environment. The industrial environment comprising an engineering system, a technical installation comprising one or more physical components and one or more client devices communicatively coupled to the engineering system and the technical installation. The engineering system is configured to perform the above-described method steps.

Embodiments of the invention are also achieved by a computer-program product having machine-readable instructions stored therein, that when executed by one or more processing unit(s), cause the one or more processing unit(s) to perform method steps as described above.

The above-mentioned and other features of embodiments of the invention will now be addressed with reference to the accompanying drawings. The illustrated embodiments are intended to illustrate, but not limit the invention.

BRIEF DESCRIPTION

Some of the embodiments will be described in detail, with reference to the following figures, wherein like designations denote like members, wherein:

FIG. 4B is a process flowchart illustrating an exemplary method of generating an automation engineering project, according to an embodiment of the present invention;

DETAILED DESCRIPTION

In the following description, for the purpose of explanation, numerous specific details are set forth in order to provide thorough understanding of one or more embodiments. It may be evident that such embodiments may be practiced without these specific details.

Figure 1:
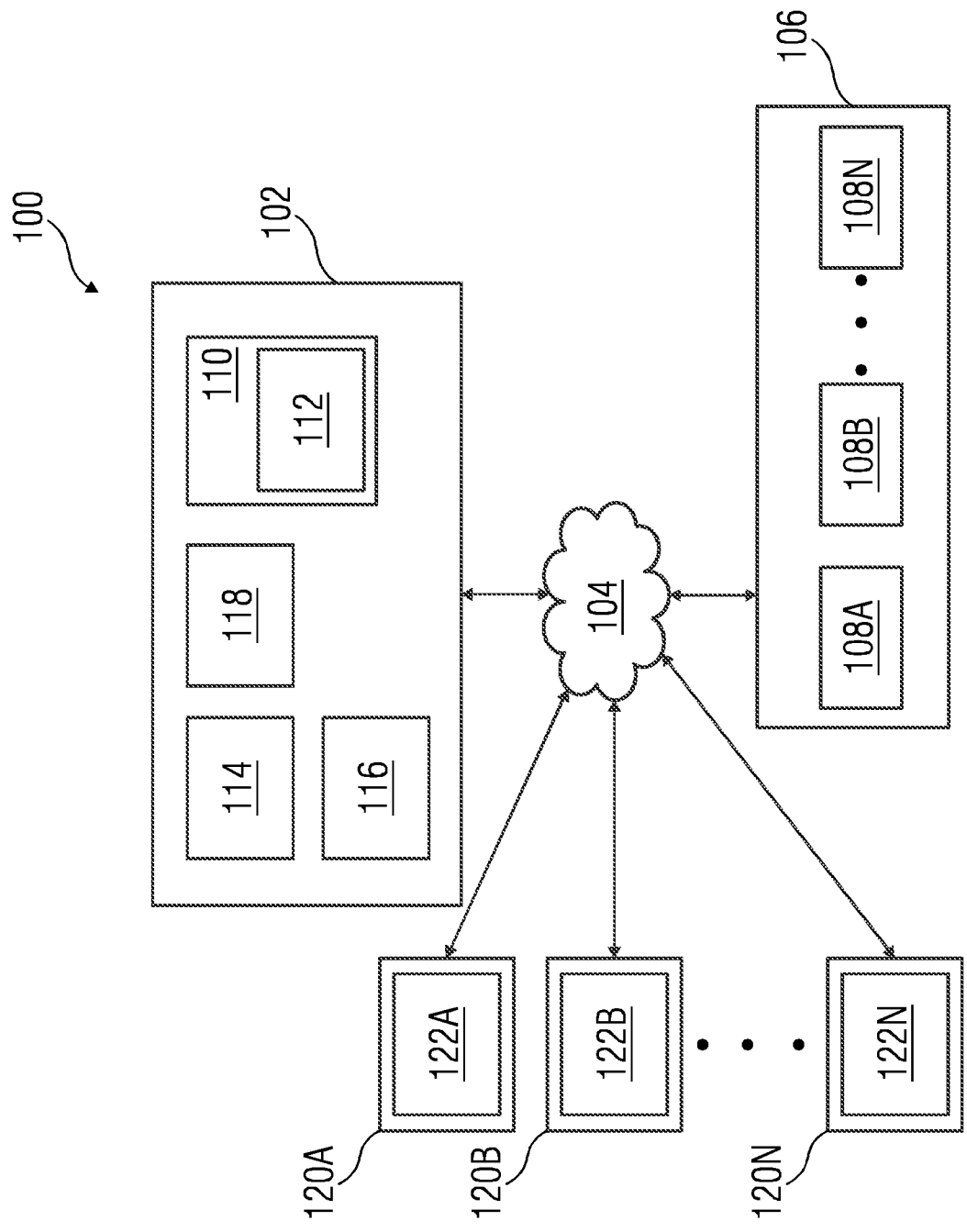
FIG. 1 is a block diagram of an industrial environment capable of generating an automation engineering project in a technical installation using a multidisciplinary approach, according to an embodiment of the present invention.

FIG. 1 is a block diagram of an industrial environment 100 capable of generating an automation engineering project in a technical installation 106, according to an embodiment of the present invention. In FIG. 1, the industrial environment 100 includes an engineering system 102 which can be controlled with one of a first automation engineering project, a second automation engineering project and one or more client devices 120A-N. As used herein, "industrial environment" refers to a processing environment comprising configurable computing physical and logical resources, for example, networks, servers, storage, applications, services, etc., and data distributed over a platform, such as cloud computing platform. The first automation engineering project and the second automation engineering project are a collection of programs, software configurations, hardware configurations, and wiring related documents which enable an automation of a plurality of hardware equipments 108A-N of the technical installation 106. Examples of the plurality of hardware equipment 108A0N comprises servers, robots, switches, automation devices, programmable logic controllers (PLC)s, human machine interfaces (HMIs), motors, valves, pumps, actuators, sensors and other hardware equipment(s). The industrial environment 100 provides on-demand network access to a shared pool of the configurable computing physical and logical resources. The engineering system 102 is communicatively connected to the plurality of hardware equipments 108A-N of the technical installation 106 via the network 104 (such as Local Area Network (LAN), Wide Area Network (WAN), Wi-Fi, Internet, any short range or wide range communication). The engineering system 102 is also connected to the one or more client devices 120A-N via the network 104.

The first automation engineering project and the second automation engineering project comprises a plurality of engineering objects. Each of the plurality of engineering objects comprises design information and source code associated with a specific aspect or a specific industrial process of the plurality of hardware equipment 108A-N of the technical installation 106. Examples of the plurality of engineering objects comprises a design file, a program logic controller block, a tag table, an alarm object, a plant automation object, a program file, an openness file, an automation markup language (AML) file, a memory object, and a piping and instrumentation diagram of the technical installation 106. Each of the plurality of engineering objects may have a different specification of a plurality of specifications. A specification of an engineering object defines a purpose of the engineering object. The specification comprises coding languages, coding conventions, software configurations, processing speed restrictions, memory restrictions, and key process indicators associated with the engineering object. Each of the one or more engineering objects comprises information and source code required to control a specific hardware equipment in the plurality of hardware equipments 108A-N of the technical installation 106.

The plurality of engineering objects may further include source code associated with hardware configurations of each of the plurality of hardware equipments 108A-N of the technical installation 106. The plurality of hardware equipments 108A-N may be connected to each other or several other components (not shown in FIG. 1) via physical connections. The physical connections may be through wiring between the plurality of hardware equipments 108A-N. Alternatively, the plurality of hardware equipments 108A-N may also be connected via non-physical connections (such as Internet of Things (IOT)) and 5G networks. Although, FIG. 1 illustrates the engineering system 102 connected to the plurality of hardware equipments 108A-N. One skilled in the conventional art can envision that the first and the second automation engineering projects may be stored in a memory storage device of the engineering system 102 or be stored in one or more servers located at different geographical locations.

The client devices 120A-N may be a desktop computer, laptop computer, tablet, smart phone and the like. Each of the client devices 120A-N is provided with an engineering tool 122A-N for generating and/or editing a plurality of engineering projects respectively. The plurality of engineering projects comprises engineering projects which are designed for controlling the technical installation 106. Examples of the technical installation 106 includes but is not limited to manufacturing plants, power plants, and recycling plants.

The client devices 120A-N can access the engineering system 102 for automatically generating engineering projects. The client devices 120A-N can access cloud applications (such as providing performance visualization of the one or more engineering objects via a web browser). Throughout the specification, the terms "client device" and "user device" are used interchangeably.

The engineering system 102 may be a standalone server deployed at a control station or may be a remote server on a cloud computing platform. In an embodiment, the engineering system 102 may be a cloud-based engineering system. The engineering system 102 is capable of delivering applications (such as cloud applications) for managing the automation engineering project comprising the one or more engineering objects. The engineering system 102 may comprise a platform 110 (such as a cloud computing platform), an automation module 112, a server 114 including hardware resources and an operating system (OS), a network interface 116 and a database 118. The network interface 116 enables communication between the engineering system 102 and the client device(s) 120A-N. The interface (such as cloud interface) (not shown in FIG. 1) may allow the engineers at the one or more client device(s) 120A-N to access a plurality of engineering project files stored at the engineering system 102 and perform one or more actions on the plurality of engineering project files as same instance. The server 114 may include one or more servers on which the OS is installed. The servers 114 may comprise one or more processing units, one or more storage devices, such as, memory units, for storing data and machine-readable instructions for example, applications and application programming interfaces (APIs), and other peripherals required for providing computing (such as cloud computing) functionality. The platform 110 enables functionalities such as data reception, data processing, data rendering, data communication, etc. using the hardware resources and the OS of the servers 114 and delivers the aforementioned services using the application programming interfaces deployed therein. The platform 110 may comprise a combination of dedicated hardware and software built on top of the hardware and the OS. In an exemplary embodiment, the platform 110 may correspond to an Integrated Development Environment (IDE) comprising program editors and compilers which allow the users of the client devices 120A-N to generate engineering projects. The platform 110 may further comprise an automation module 112 configured for generating engineering projects. Details of the automation module 112 is explained in FIG. 3.

The database 118 stores the information relating to the automation engineering project and the client device(s) 120A-N. The database 118 is, for example, a SPARQL, a structured query language (SQL) data store or a not only SQL (NoSQL) data store. In an exemplary embodiment, the database 118 may be configured as cloud-based database implemented in the industrial environment 100, where computing resources are delivered as a service over the platform 110. The database 118, according to another embodiment of the present invention, is a location on a file system directly accessible by the automation module 112. The database 118 is configured to store engineering project files, engineering projects, object behavior model, parameter values associated with the one or more engineering objects, test results, simulation results, status messages, one or more simulation instances, graphical programs, program logics, program logic patterns, the one or more engineering objects and engineering object properties, one or more engineering object blocks, relationship information between the one or more engineering objects, requirements, program update messages and the like.

Figure 2:
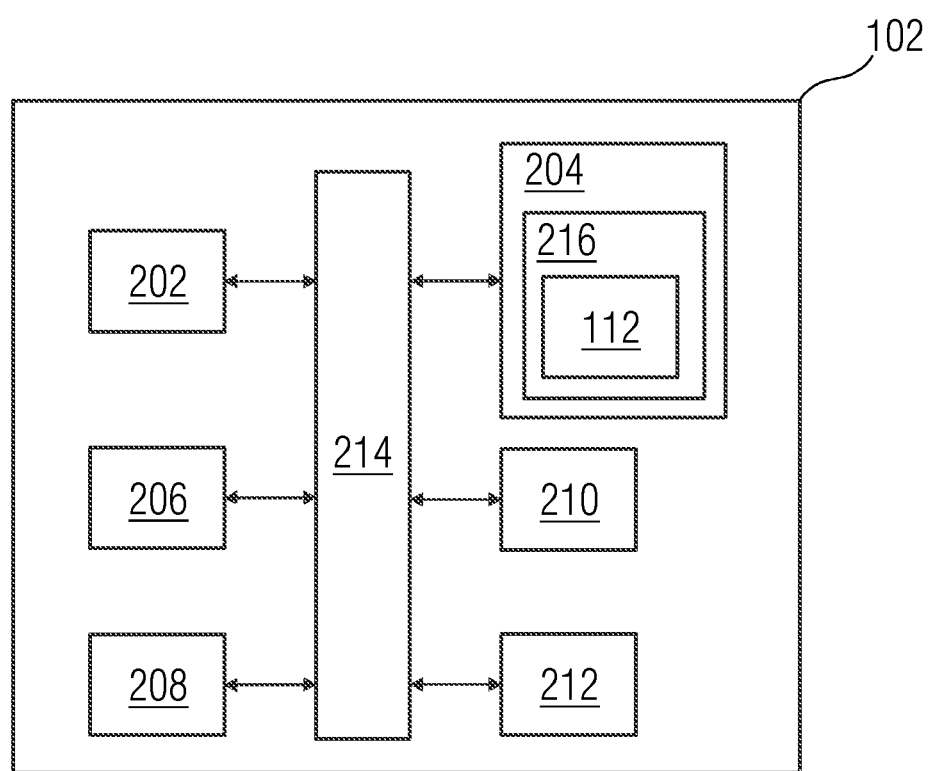
FIG. 2 is a block diagram of an engineering system, such as those shown in FIG. 1, in which an embodiment of the present invention can be implemented.

FIG. 2 is a block diagram of an engineering system 102, such as those shown in FIG. 1, in which an embodiment of the present invention can be implemented. In FIG. 2, the engineering system 102 includes a processing unit 202, an accessible memory 204, a storage unit 206, a communication interface 208, an input-output unit 210, a network interface 212 and a bus 214. The processing unit 202, as used herein, means any type of computational circuit, such as, but not limited to, a micro processing unit unit, microcontroller, complex instruction set computing micro processing unit unit, reduced instruction set computing micro processing unit unit, very long instruction word micro processing unit unit, explicitly parallel instruction computing micro processing unit unit, graphics processing unit, digital signal processing unit, or any other type of processing circuit. The processing unit 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the processing unit 202, such as being a computer-readable storage medium. The processing unit 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes an integrated development environment (IDE) 216. The IDE 216 includes an automation module 112 stored in the form of machine-readable instructions on any of the above-mentioned storage media and may be in communication with and executed by the processing unit 202. In one example, the first and the second automation engineering projects may be stored inside the memory 204.

The storage unit 206 may be a non-transitory storage medium configured for storing a database (such as database 118) which comprises server version of the one or more engineering object 108A-N associated with the automation engineering project.

The communication interface 208 is configured for establishing communication sessions between the one or more client devices 120A-N and the engineering system 102. The communication interface 208 allows the one or more engineering applications running on the client devices 120A-N to import/export engineering project files into the engineering system 102. In an embodiment, the communication interface 208 interacts with the interface at the one or more client devices 120A-N for allowing the engineers to access the automation engineering projects associated with an automation engineering project file and perform one or more actions on the automation engineering projects stored in the engineering system 102.

The input-output unit 210 may include input devices a keypad, touch-sensitive display, camera (such as a camera receiving gesture-based inputs), etc. capable of receiving one or more input signals, such as user commands to process engineering project file. Also, the input-output unit 210 may be a display unit for displaying a graphical user interface which visualizes the behavior model associated with the modified engineering projects and also displays the status information associated with each set of actions performed on the graphical user interface. The set of actions may include execution of predefined tests, download, compile and deploy of graphical programs. The bus 214 acts as interconnect between the processing unit 202, the memory 204, and the input-output unit 210.

The network interface 212 may be configured to handle network connectivity, bandwidth and network traffic between the engineering system 102, client devices 120A-N and the automation engineering project.

Those of ordinary skilled in the conventional art will appreciate that the hardware depicted in FIG. 2 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the conventional art will recognize that, for simplicity and clarity, the full structure and operation of all data processing systems suitable for use with the present disclosure is not being depicted or described herein. Instead, only so much of an engineering system 102 as is unique to the present disclosure or necessary for an understanding of the present disclosure is depicted and described. The remainder of the construction and operation of the engineering system 102 may conform to any of the various current implementation and practices known in the conventional art.

Figure 3:
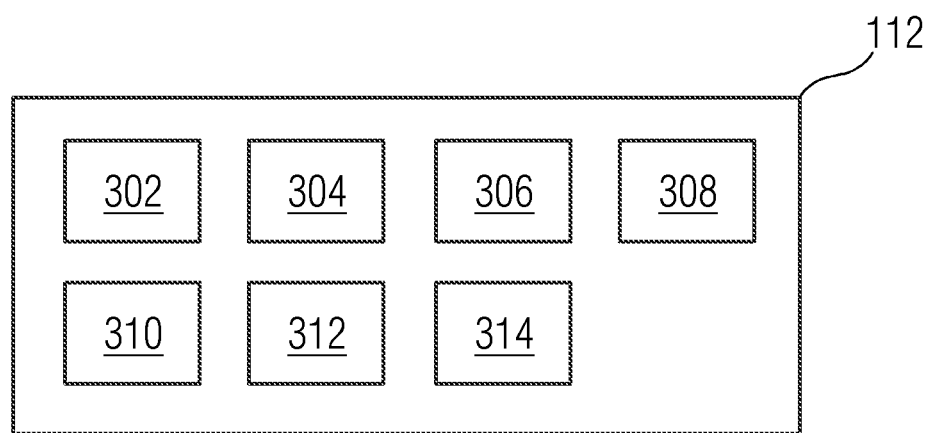
FIG. 3 is a block diagram of an automation module, such as those shown in FIG. 2, in which an embodiment of the present invention can be implemented.
Figure 4A:
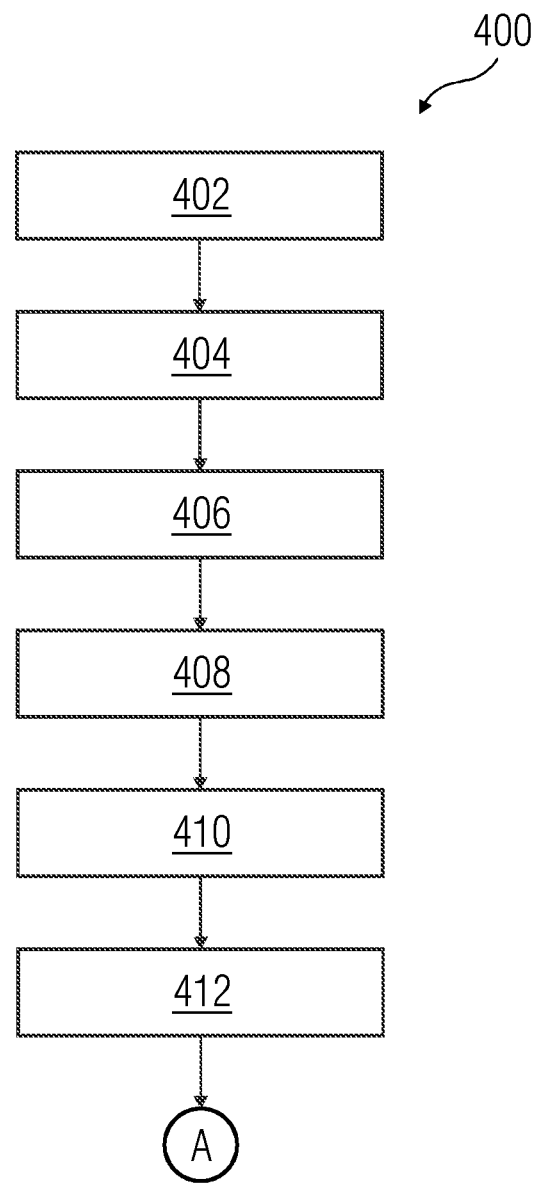
FIG. 4A is a process flowchart illustrating an exemplary method of generating an automation engineering project, according to an embodiment of the present invention.
Figure 4C:
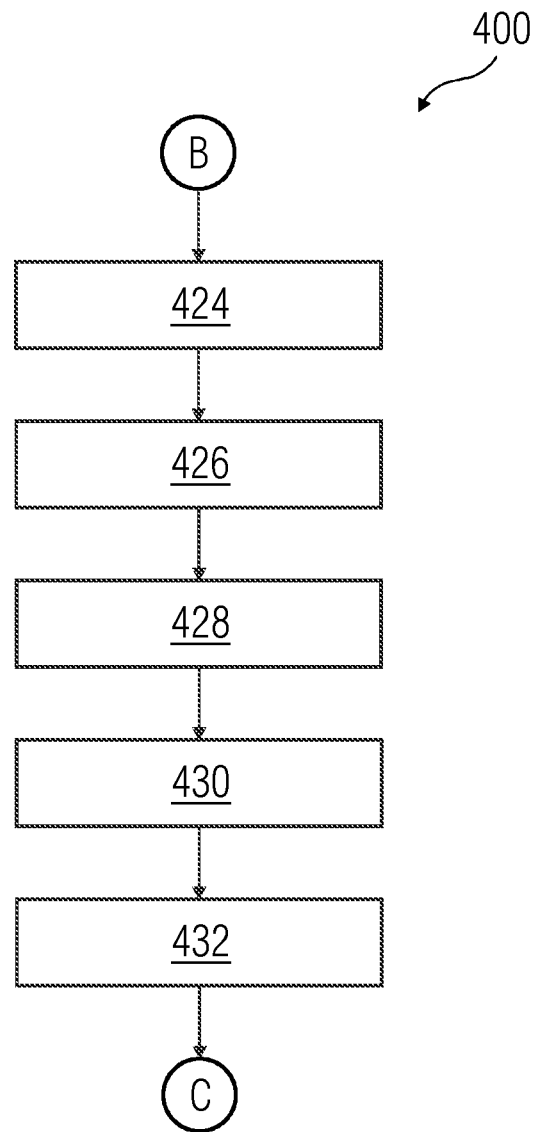
FIG. 4C is a process flowchart illustrating an exemplary method of generating an automation engineering project, according to an embodiment of the present invention.
Figure 4D:
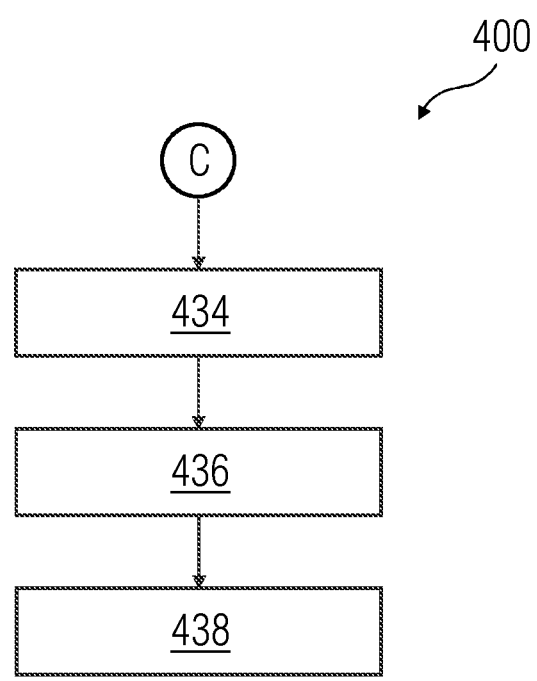
FIG. 4D is a process flowchart illustrating an exemplary method of generating an automation engineering project, according to an embodiment of the present invention.

FIG. 3 is a block diagram of an automation module 112, such as those shown in FIG. 2, in which an embodiment of the present invention can be implemented. In FIG. 3, the automation module 112 comprises a request handler module 302, a ontology generator module 304, an analysis module 306, a modifier module 308, an automation engineering project database 310, a validation module 312 and a deployment module 314. FIG. 3 is explained in conjunction with FIG. 1 and FIG. 2.

The request handler module 302 is configured for receiving the request to generate the automation engineering project. For example, the request is received from one of the one or more users external to the industrial environment 100 via a network. In alternative embodiment, the request is received from the one or the one or more client devices 120A-N via the network.

The ontology generator module 304 is configured for generating a name graph from a hardware configuration file associated with the plurality of hardware equipment 108A-N. In an embodiment, the ontology generator module 304 is configured to generate a knowledge graph from the hardware configuration file. The hardware configuration file is encoded as an automation markup language script. The ontology generator module 304 is configured to analyze the automation markup language script to detect a plurality of nodes in the first automation markup language script. The ontology generator module 304 is configured to convert each of the plurality of nodes to one or more knowledge graph triples. The ontology generator module 304 is configured to generate the first name graph from the one or more knowledge graph triples. The first name graph comprises a knowledge graph based semantic representation of hierarchical relationships between each of the plurality of nodes in the automation markup language script. In one example, the ontology generator module 304 is configured to analyze the automation markup language script by application of a natural language processing algorithm on the hardware configuration.

The analysis module 306 is configured for analyzing the name graph generated by the ontology generator module 304. Specifically, the analysis module 306 is configured for mapping a plurality of nodes of the name graph to the plurality of hardware equipment 108A-N of the technical installation 106. Furthermore, the analysis module 306 is configured for analyzing the behavior of the plurality of hardware equipment 108A-N based on the generated name graph.

The modifier module 308 is configured for modifying the one or more engineering objects based on the outcome of analysis of the name graph. The one or more engineering objects is modified based on the analysis of the name graph. The modifications comprise any changes such as addition, deletion, update, replacement or revision of one or more variables, code lines, classes, functions, or comments in the one or more engineering objects. Thus, the one or more engineering objects are modified based on the relationships between the set of variables corresponding to the plurality of Key process indicators associated with the plurality of industrial processes and the automation engineering project. Thus, the plurality of engineering projects is generated based on the relationships between the set of variables corresponding to each logical block in the one or more engineering objects, the set of Key process indicators associated with the one or more engineering objects, and the industrial domain of the automation engineering project.

The automation engineering project database 310 is configured for storing an automation engineering project library comprising a plurality of engineering projects and the generated name graph. The automation engineering project database 310 is configured for continuously updating the automation engineering project library with updated versions of the optimized engineering project. Also, the automation engineering project database 310 is configured for maintaining the automation engineering project library in the generated name graph.

The validation module 312 is configured to generate a simulation instance for the industrial environment 100. In one example, the simulation instance is a digital twin of the plurality of hardware equipment 108A-N which are functioning in the technical installation 106 of the industrial environment 100. The validation module 312 is configured to simulate execution of the first automation engineering project on the plurality of hardware equipment 108A-N in a simulation environment by executing the generated first engineering object on the generated simulation instance.

The deployment module 314 is configured for deploying the optimized engineering project onto the industrial environment 100 based on the validation. The optimized engineering project is only deployed after the determination that the optimized engineering project is valid.

The automation module 112 causes the processing unit 202 to receive a request to generate a first automation engineering project for a technical installation. The request comprises information about hardware configuration associated with the plurality of hardware equipment 108A-N of the technical installation 106.

The information about the hardware configuration is coded as a first automation markup language script or the like. In one example, the hardware configuration is converted into the first automation markup language script by the processing unit 202. The hardware configuration comprises a power rating, a voltage rating, a durability, a strength, a electrical component configurations, symbol definitions, voltage and wiring aspects, associated with the plurality of hardware equipment 108A-N in the technical installation 106.

The first automation markup language script is encoded in an exchange data file which is used to exchange technical information between a hardware engineer and an automation engineer. The hardware configuration is encoded in the first automation markup language script in a hierarchical structure. The first automation markup language script comprises information about interrelationships between the plurality of hardware equipment 108A-N and a plurality of engineering objects of the second automation engineering project stored in the database 114. The plurality of engineering objects comprises software objects such as a program file, an openness file, an programming block, or a memory object. The second automation engineering project is an existing engineering project configured to control and automate the plurality of hardware equipment 108A-N in the technical installation 106.

The automation module 112 further causes the processing unit 202 to analyze the first automation markup language script to detect a plurality of nodes in the first automation markup language script.

The automation module 112 further causes the processing unit 202 to convert each of the plurality of nodes to one or more knowledge graph triples. Thus, the hierarchical relationships within the first automation markup language script is converted into a semantic representation of the one or more knowledge graph triples. The automation module 112 further causes the processing unit 202 to generate a first name graph from the one or more knowledge graph triples. The first name graph comprises a knowledge graph based semantic representation of hierarchical relationships between each of the plurality of nodes in the first automation markup language script.

The first name graph comprises information about relationships between the hardware configuration of the plurality of hardware equipment 108A-N and a plurality of engineering objects associated with the second automation engineering project. The automation module 112 further causes the processing unit 202 to receive from a user, by the processing unit, information about one or more modifications in the hardware configuration of plurality of hardware equipment 108A-N. In one example, the user may use an electrical designer application to modify the hardware configuration of the plurality of hardware equipment 108A-N. In another example, the user may rearrange the plurality of hardware equipments 108A-N, and rewire interconnections between the plurality of hardware equipments 108A-N to modify the hardware configuration of the plurality of hardware equipments 108A-N. In such a case, a modification in an arrangement of the plurality of hardware equipments 108A-N is encoded as a second automation markup language script. The second automation markup language script comprises information about the hardware configuration of the plurality of hardware equipment 108A-N, after the modification of the hardware configuration of the plurality of hardware equipment 108A-N.

The automation module 112 further causes the processing unit 202 to analyze the first name graph, and the one or more modifications in the hardware configuration of the plurality of hardware equipment. The automation module 112 further causes the processing unit 202 to generate a second name graph based on the analysis of the one or more modifications of the hardware configuration of the technical installation. The second name graph comprises information about relationships between a modified hardware configuration of the technical installation and the plurality of engineering objects.

The automation module 112 further causes the processing unit 202 to determine a first hierarchical path between at least two nodes of the first name graph, and a second hierarchical path between corresponding nodes of the second name graph. The automation module 112 further causes the processing unit 202 to compare the determined first hierarchical path and the second hierarchical path.

The automation module 112 further causes the processing unit 202 to determine the plurality of differences between the first name graph and the second name graph, based on the comparison. In one example, the plurality of differences are determined by the processing unit by use of a knowledge graph query process. The automation module 112 further causes the processing unit 202 to mape the determined plurality of differences to one or more engineering objects of the plurality of engineering objects.

The automation module 112 further causes the processing unit 202 to modify the one or more engineering objects of the plurality of engineering objects based on the second name graph. The automation module 112 further causes the processing unit 202 to generate the first automation engineering project from the plurality of engineering objects which comprises the one or more modified engineering objects.

The automation module 112 further causes the processing unit 202 to analyze the second name graph to generate one or more user suggestions for modification of the first automation engineering project. The automation module 112 further causes the processing unit 202 to display the one or more user suggestions to one or more users.

The automation module 112 further causes the processing unit 202 to generate a simulation instance for the industrial environment 100. The automation module 112 further causes the processing unit 202 to simulate deployment of the generated first automation engineering project in the industrial environment 100 by executing one or more functionalities of the first automation engineering project on the generated simulation instance.

The automation module 112 further causes the processing unit 202 to determine whether the generated first automation engineering project is valid, based on a result of the simulated execution of the generated first automation engineering project. The automation module 112 further causes the processing unit 202 to deploy the first automation engineering project in real-time onto the industrial environment 100, based on a determination that the generated first automation engineering project is valid. The method further comprises displaying, by the processing unit, the first automation engineering project on one of a display device.

FIGS. 4A-D is a process flowchart illustrating an exemplary method 400 of generating an automation engineering project in an engineering system 102 using a multidisciplinary approach, according to an embodiment of the present invention.

At step 402, a request is received to generate the first automation engineering project for the technical installation 106. The request comprises information about hardware configuration associated with the plurality of hardware equipment 108A-N of the technical installation 106. The information about the hardware configuration is coded as a first automation markup language script or the like. In one example, the hardware configuration is converted into the first automation markup language script by the processing unit 202. The hardware configuration comprises a power rating, a voltage rating, a durability, a strength, a electrical component configurations, symbol definitions, voltage and wiring aspects, associated with the plurality of hardware equipment 108A-N in the technical installation 106.

The first automation markup language script is encoded in an exchange data file which is used to exchange technical information between a hardware engineer and an automation engineer. The hardware configuration is encoded in the first automation markup language script in a hierarchical structure. The first automation markup language script comprises information about interrelationships between the plurality of hardware equipment 108A-N and a plurality of engineering objects of the second automation engineering project stored in the database 114. The plurality of engineering objects comprises software objects such as a program file, an openness file, an programming block, or a memory object. The second automation engineering project is an existing engineering project configured to control and automate the plurality of hardware equipment 108A-N in the technical installation 106.

At step 404, the first automation markup language script is analyzed by the processing unit 202 to detect a plurality of nodes in the first automation markup language script.

At step 406, each of the plurality of nodes is converted by the processing unit 202, to one or more knowledge graph triples. Thus, the hierarchical relationships within the first automation markup language script is converted into a semantic representation of the one or more knowledge graph triples.

At step 408, a first name graph is generated by the processing unit 202, from the one or more knowledge graph triples. The first name graph comprises a knowledge graph based semantic representation of hierarchical relationships between each of the plurality of nodes in the first automation markup language script. The first name graph comprises information about relationships between the hardware configuration of the plurality of hardware equipment 108A-N and a plurality of engineering objects associated with the second automation engineering project.

At step 410, information about one or more modifications in the hardware configuration of plurality of hardware equipment 108A-N is received by the processing unit 202. In one example, the user may use an electrical designer application to modify the hardware configuration of the plurality of hardware equipment 108A-N. In another example, the user may rearrange the plurality of hardware equipments 108A-N, and rewire interconnections between the plurality of hardware equipments 108A-N to modify the hardware configuration of the plurality of hardware equipments 108A-N. In such a case, a modification in an arrangement of the plurality of hardware equipments 108A-N is encoded as a second automation markup language script. The second automation markup language script comprises information about the hardware configuration of the plurality of hardware equipment 108A-N, after the modification of the hardware configuration of the plurality of hardware equipment 108A-N.

At step 412, the first name graph, and the one or more modifications in the hardware configuration of the plurality of hardware equipment is analyzed by the processing unit 202.

At step 414, a second name graph is generated by the processing unit 202 based on the analysis of the one or more modifications of the hardware configuration of the technical installation. The second name graph comprises information about relationships between a modified hardware configuration of the technical installation and the plurality of engineering objects.

At step 416, a first hierarchical path is determined by the processing unit 202 between at least two nodes of the first name graph, and a second hierarchical path between corresponding nodes of the second name graph.

At step 418, the determined first hierarchical path and the second hierarchical path is compared by the processing unit 202.

At step 420, the plurality of differences between the first name graph and the second name graph are determined by the processing unit 202, based on the comparison. In one example, the plurality of differences are determined by the processing unit by use of a knowledge graph query process.

At step 422, the determined plurality of differences are mapped by the processing unit 202 to one or more engineering objects of the plurality of engineering objects.

At step 424, the one or more engineering objects of the plurality of engineering objects are modified by the processing unit 202 based on the second name graph.

At step 426, the first automation engineering project is generated by the processing unit 202, from the plurality of engineering objects which comprises the one or more modified engineering objects.

At step 428, the second name graph is analyzed by the processing unit 202, to generate one or more user suggestions for modification of the first automation engineering project.

At step 430, the one or more user suggestions are displayed by the processing unit 202, to one or more users via a display device such as a liquid crystal display (LCD) panel.

At step 432, a simulation instance is generated by the processing unit 202, for the industrial environment 100.

At step 434, deployment of the generated first automation engineering project in the industrial environment 100 is simulated by the processing unit 202, by executing one or more functionalities of the first automation engineering project on the generated simulation instance.

At step 436, it is determined by the processing unit 202, whether the generated first automation engineering project is valid based on a result of the simulated execution of the generated first automation engineering project.

At step 438, the first automation engineering project is deployed by the processing unit 202, in real-time onto the industrial environment 100, based on a determination that the generated first automation engineering project is valid. The method further comprises displaying, by the processing unit, the first automation engineering project on one of a display device.

Figure 5:
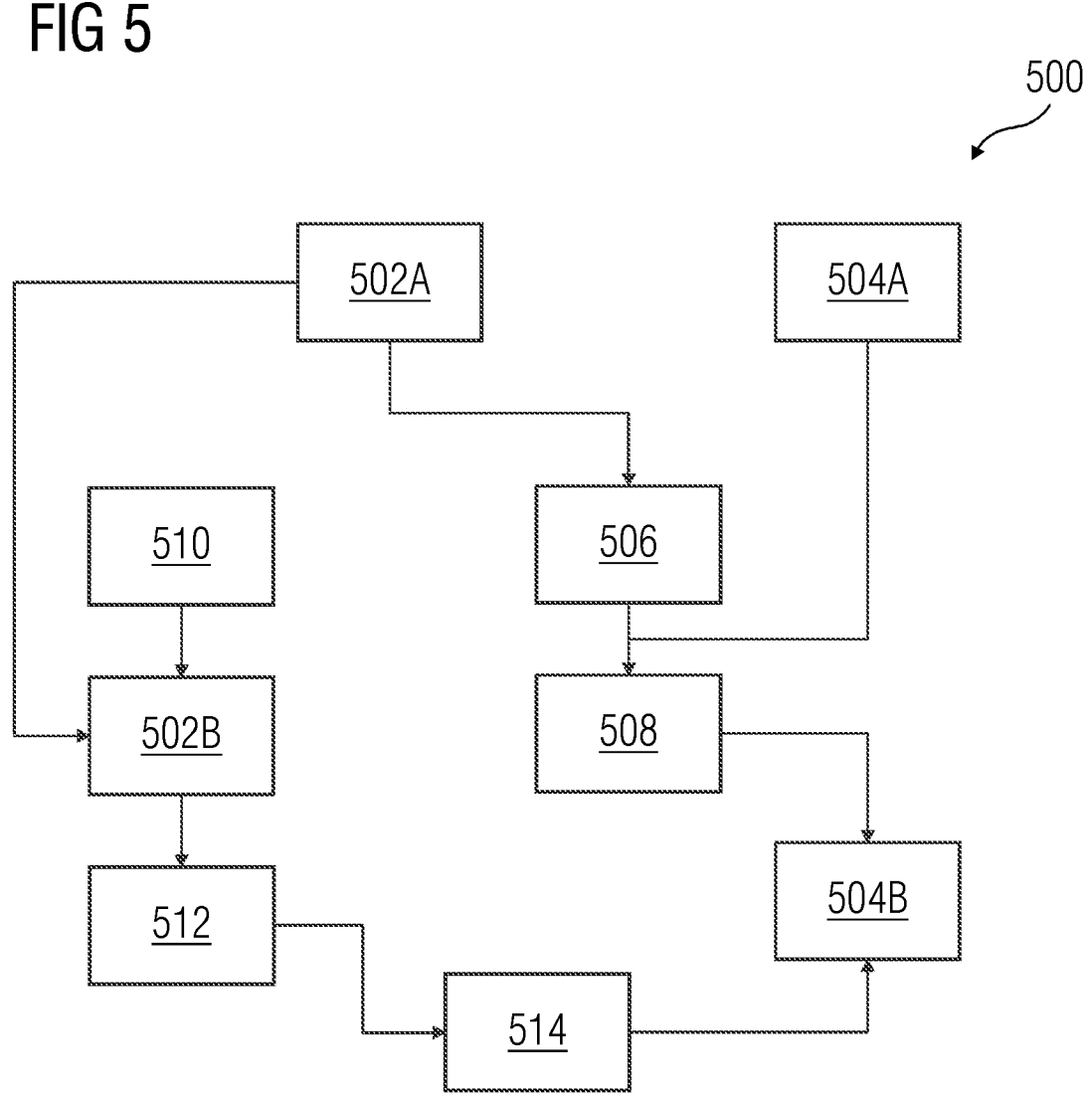
FIG. 5 is a process flow diagram illustrating an exemplary method of generating an automation engineering project, according to an embodiment of the present invention.

FIG. 5 is a process flow diagram 500 illustrating an exemplary method of generating an automation engineering project, according to an embodiment of the present invention. FIG. 5 is explained in conjunction with FIGS. 1, 2, 3, and 4A-D.

The process flow diagram 500 illustrates a first hardware configuration file 502A and a first automation engineering project 504A. The first automation engineering project 504A comprises a plurality of engineering objects configured to control the plurality of hardware equipment 108A-N in the technical installation 106. The first hardware configuration file 502A comprises information about hardware configuration such as wiring aspects, power rating, voltage rating, and the like of each of the plurality of hardware equipment 108A-N in the technical installation 106. The first automation engineering project 504B comprises a plurality of engineering objects configured to control the plurality of hardware equipment 108A-N. The plurality of engineering objects comprises programming blocks, source codes, program files, and the like.

The first hardware configuration file 502A is converted by the processing unit 202, into the first automation markup language script 506. The processing unit 202 is further configured to generate a first name graph 508 from the first engineering program and the first automation markup language script 506.

In one example, a user 510 may introduce one or more modifications 502B to the first hardware configuration file 502A. The processing unit 202 is further configured to convert the one or more modifications 502B into a second automation markup language script 512. The second automation markup language script is further converted by the processing unit 202 into a second name graph 514. The processing unit 202 is further configured to generate a second automation engineering project 504B based on a plurality of differences between the first name graph 508 and the second name graph 514.

Embodiments of the present invention can take a form of a computer program product (non-transitory computer readable storage medium having instructions, which when executed by a processor, perform actions) comprising program modules accessible from computer-usable or computer-readable medium storing program code for use by or in connection with one or more computers, processing units, or instruction execution system. For the purpose of this description, a computer-usable or computer-readable medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the conventional art.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for generating an automation engineering project in a technical installation using a multidisciplinary approach, the method comprising:
   receiving, by a processing unit, a request to generate a first automation engineering project for a technical installation, wherein the request comprises information of a hardware configuration associated with a plurality of hardware equipment in the technical installation, and the information of the hardware configuration comprises information associated with one of a power rating, a voltage rating, a durability, a strength, and wiring aspects associated with the plurality of hardware equipment in the technical installation;
   generating, by the processing unit, a first automation markup language script based on the hardware configuration associated with the plurality of hardware equipment;
   generating, by the processing unit, a first name graph based on the generated first automation markup language script and a second automation engineering project, wherein the second automation engineering project is an existing engineering project configured to control and automate the plurality of hardware equipment in the technical installation, wherein
      the second automation engineering project is configured to automate a plurality of engineering objects, wherein each engineering object includes source code associated with hardware configurations of each of the plurality of hardware equipment, and
      the first name graph comprises information about relationships between the hardware configuration of the plurality of hardware equipment and the plurality of engineering objects associated with the second automation engineering project;
   receiving from a user, by the processing unit, information about one or more modifications in the hardware configuration of plurality of hardware equipment, wherein the modifications comprise update, replacement or revision of one or more variables corresponding to Key process indicators associated with the one or more engineering objects;
   converting, by the processing unit, the one or more modifications in the hardware configuration of the plurality of hardware equipment into a second automation markup language script;
   analyzing, by the processing unit, the first name graph, and the second automation markup language script;
   generating, by the processing unit, a second name graph based on the analysis of the second automation markup language script, wherein the second name graph comprises information about relationships between a modified hardware configuration of the technical installation based on the one or more modifications and the plurality of engineering objects;
   generating, by the processing unit, the first automation engineering project from the plurality of engineering objects based on a comparison of the first name graph and the second name graph, wherein the generating the first automation engineering project includes modifying the one or more engineering objects based on the modifications, wherein the comparison comprises determining a first hierarchical path between at least two nodes of the first name graph and a second hierarchical path between corresponding nodes of the second name graph, comparing the determined first hierarchical path and the second hierarchical path, and determining a plurality of differences between the first name graph and the second name graph, and wherein the generating the first automation engineering project includes modifying the one or more engineering objects based on the determined plurality of difference;
   generating, by the processing unit, a simulation instance for an industrial environment; and
   simulating, by the processing unit, deployment of the generated first automation engineering project in the industrial environment by executing one or more functionalities of the first automation engineering project on the generated simulation instance.

2. The method according to claim 1, wherein the information about the hardware configuration is coded as a first automation markup language script.

3. The method according to claim 2, wherein generating the first name graph comprises:
   analyzing, by the processing unit, the first automation markup language script to detect a plurality of nodes in the first automation markup language script;
   converting, by the processing unit, each of the plurality of nodes to one or more knowledge graph triples; and
   generating, by the processing unit, the first name graph from the one or more knowledge graph triples wherein the first name graph comprises a knowledge graph based semantic representation of hierarchical relationships between each of the plurality of nodes in the first automation markup language script.

4. The method according to claim 3, wherein generating, the second name graph comprises:

generating, by the processing unit, the second automation markup language script into a knowledge graph instance;

integrating, by the processing unit, the knowledge graph instance into the first name graph; and generating, by the processing unit, the second name graph based on integration of the knowledge graph instance into the first name graph.

5. The method according to claim 3, wherein generating the automation engineering project comprises:

determining, by the processing unit, a plurality of differences between the first name graph and the second name graph;

mapping, by the processing unit, the determined plurality of differences to one or more engineering objects of the plurality of engineering objects;

modifying, by the processing unit, the one or more engineering objects of the plurality of engineering objects based on the determined plurality of differences; and generating, by the processing unit, the first automation engineering project from the one or more modified engineering objects of the plurality of engineering objects.

6. The method according to claim 1, further comprising:

analyzing, by the processing unit, the second name graph to determine one or more user suggestions for modification of the first automation engineering project; and displaying, by the processing unit, the one or more user suggestions to one or more users.

7. The method according to claim 6, wherein the one or more engineering objects is one of a program file, an openness file, an automation markup language file, a memory object, a physical engineering equipment, and piping and instrumentation diagram.

8. The method according to claim 6, further comprising:

generating, by the processing unit, a simulation instance for an industrial environment; and simulating, by the processing unit, deployment of the generated first automation engineering project in the industrial environment by executing one or more functionalities of the first automation engineering project on the generated simulation instance.

9. The method according to claim 8, further comprising:

determining, by the processing unit, whether the generated first automation engineering project is valid, based on a result of the simulated execution of the generated first automation engineering project;

deploying, by the processing unit, the first automation engineering project in real-time onto the industrial environment, based on a determination that the generated first automation engineering project is valid; and displaying, by the processing unit, the first automation engineering project on one of a display device.

10. An engineering system for generation of an automation engineering project in a technical installation, wherein the engineering system comprises:

one or more processing unit; and a memory coupled to the one or more processing unit(s), wherein the memory comprises an automation module stored in the form of machine-readable instructions executable by the one or more processing unit(s), wherein the automation module is capable of performing a method according to claim 1.

11. An industrial environment comprising:

an engineering system, the engineering system having one or more processing units, and a memory coupled to the one or more processing units, wherein the memory comprises an automation module stored in the form of machine-readable instructions executable by the one or more processing units, wherein the automation module is capable of performing a method according to claim 1;

a technical installation comprising one or more physical components; and one or more client devices communicatively coupled to the engineering system via a network.

12. A computer-program product, having machine-readable instructions stored therein, that when executed by a processing unit, cause the processing unit to perform the method according to claim 1.

* * * * *